J. E. MAYNADIER.
BILLIARD-TABLE CUSHIONS.

No. 187,655. Patented Feb. 20, 1877.

Witnesses:
Geo. H. Graham.
Jacob Felbel

Inventor;
James E. Maynadier
by J. N. McGuire
Attorney.

UNITED STATES PATENT OFFICE.

JAMES E. MAYNADIER, OF BOSTON, MASSACHUSETTS, ASSIGNOR TO HUGH W. COLLENDER, OF NEW YORK, N. Y.

IMPROVEMENT IN BILLIARD-TABLE CUSHIONS.

Specification forming part of Letters Patent No. 187,655, dated February 20, 1877; application filed January 11, 1877.

*To all whom it may concern:*

Be it known that I, JAMES E. MAYNADIER, of Boston, in the county of Suffolk and State of Massachusetts, have invented an Improved Cushion for Billiard-Tables, of which the following is a full, clear, concise, and exact description, reference being had to the accompanying drawings making a part hereof.

Previous to my invention billiard-table cushions of that kind composed of a rubber body and some sort of incorporated face-hardening strip or device have been made with the face-hardening strip either molded in or inserted in a cavity cored out of the rubber, or in a slit cut in the molded mass.

My invention consists in a cushion having the rubber molded with a flap or in such shape that a portion of the rubber may be and is folded over onto the rest, and so as to surround and hold in place a face-hardening strip inserted in a seat or depression formed in the molded mass, substantially as will be hereinafter more fully described.

To enable those skilled in the art to make and use my invention, I will describe my improved cushion by reference to the accompanying drawings, in which I have shown, in cross-sections, a billiard-table cushion-strip and cushion embodying my invention.

Figure 1:
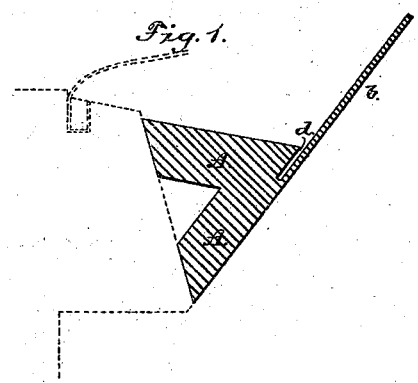
Figure 2:
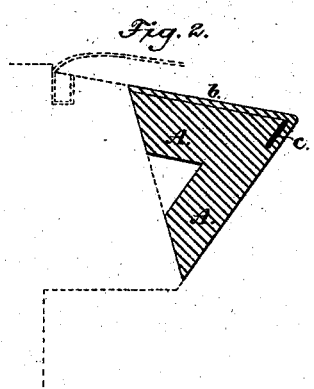

I mold a rubber strip in shape—for an instance, as seen in Figure 1—that is, with a sort of cavity or depression, as seen at $d$, and with a flap or extension, $b$, of the usual body or main portion A. In the depression $d$ I properly place a metal or other face-hardening strip, $c$, and fold down or turn over the flap or portion $b$ of the rubber, so as to confine and securely hold in place the face-hardening strip $c$, and form a complete cushion, such as shown at Fig. 2.

A cushion thus made of one piece of rubber will be durable and desirable in its structure and operation, while the insertion and renewal at any time of the strip $c$ is most easily effected.

If deemed expedient, the flap $b$ may be cemented down in finishing the cushion, and in the manufacture of my improved cushion the shape of the rubber portion may, of course, be varied without departing from my invention so long as it is composed of one piece and is so shaped that by folding one part onto the other and around the inserted face-hardening strip, the latter will be held in place.

I have shown a flat steel face-hardening strip, $c$, but other face-hardening devices may be employed in lieu thereof.

What I claim as new, and desire to secure by Letters Patent, is—

A billiard-cushion composed of a single piece of rubber having an extension or flap, $b$, a cavity or depression, $d$, and a face-hardening strip, $c$, secured in place by said flap, all substantially as and for the purpose set forth.

JAMES E. MAYNADIER. [L. S.]

Witnesses:
   GEO. O. G. COALE,
   J. BROWN LORD.